United States Patent [19]

Scott, Jr.

[11] 3,832,760
[45] Sept. 3, 1974

[54] VANE GRID STRUCTURES AND METHOD OF MAKING SAME

[75] Inventor: Russell F. Scott, Jr., Palo Alto, Calif.

[73] Assignee: Varian Associates, Palo Alto, Calif.

[22] Filed: Nov. 13, 1972

[21] Appl. No.: 306,963

Related U.S. Application Data

[60] Division of Ser. No. 69,677, Feb. 4, 1970, abandoned, which is a continuation-in-part of Ser. No. 58,422, July 27, 1970, abandoned.

[52] U.S. Cl............. 29/25.14, 29/470.5, 29/471.1, 29/472.1, 29/592, 313/348, 313/350
[51] Int. Cl............................................. H01j 9/18
[58] Field of Search...... 313/348, 350; 29/592, 428, 29/25.14, 458, 471.3, 502, 470.5, 472.1, 471.1

[56] References Cited
UNITED STATES PATENTS

| | | | |
|---|---|---|---|
| 2,738,438 | 3/1956 | Shepherd | 313/348 |
| 2,896,307 | 7/1959 | Whiteley | 313/348 X |
| 3,293,487 | 12/1966 | Pickering | 29/25.14 X |
| 3,608,167 | 9/1971 | Safran et al. | 29/472.1 X |

Primary Examiner—Charles W. Lanham
Assistant Examiner—Joseph A. Walkowski
Attorney, Agent, or Firm—Stanley Z. Cole; Robert K. Stoddard

[57] ABSTRACT

A vane grid is disclosed wherein a plurality of inwardly directed vanes are bonded at their roots to the sidewalls of an array of longitudinal slots in the inside wall of a grid ring. The grid is conveniently fabricated by machining a plurality of grid rings, stacking the grid rings, and broaching the array of slots in the inside walls of the stacked grid rings. The grid rings are then plated, the vane members assembled, and the assemblies are heated to melt the plating to form, when cooled, a bonded joint between the root portions of the vanes and the grid ring.

3 Claims, 7 Drawing Figures

PATENTED SEP 3 1974

INVENTOR.
RUSSELL F. SCOTT JR.
BY
ATTORNEY

INVENTOR.
RUSSELL F. SCOTT JR.
ATTORNEY

VANE GRID STRUCTURES AND METHOD OF MAKING SAME

RELATED CASES

The present application is a divisional application of parent U.S. patent application Ser. No. 69,677 filed Feb. 4, 1970, now abandoned which is in turn a continuation-in-part application of parent U.S. patent application Ser. No. 58,422 filed July 27, 1970, now abandoned and assigned to the same assignee as the present invention.

DESCRIPTION OF THE PRIOR ART

Heretofore, vane grid structures have been fabricated by punched part methods wherein a disc of metal was punched into a cup-shape. The bottom of the cup was then centrally punched out and serrated with an array of radial slots intersecting the central aperture in the cup. The apertured bottom wall of the cup was then punched up, parallel to the side wall of the cup, to form an annular U-shaped channel member with an array of axial slots in the inside wall of the annular channel member. Radially directed vane members with peripherally directed root portions were inserted into respective slots in the inside wall of the channel with the root portions being located in the channel. Brazing material was then utilized to fill the channel, the assembly was brazed to produce a rigid vane grid structure. Such a prior art vane grid structure and method of making same is disclosed and claimed in U.S. Pat. No. 2,738,438 issued Mar. 13, 1956, and assigned to the same assignee as the present invention.

The problem with this prior art grid structure is that the grid ring must be made of a relatively ductile material to accommodate the punched part method of fabrication. Moreover, the dies used for punching the grid ring have to be extremely precise and have to be located in a precise manner, as any lack of concentricity obtained between the hole in the bottom of the cup and the side wall or periphery of the cup manifests itself as a slanting of the array of grid vanes when assembled within the grid ring.

Another problem with this method of manufacturing vane grids is that the punch and die tooling is relatively expensive for each particular grid structure and this tooling is useful for manufacture of only the one size of grid. Therefore, to manufacture other sizes of grids requires additional sets of expensive tooling. The tooling is not easily modified to permit manufacture of another grid size.

SUMMARY OF THE PRESENT INVENTION

The principal object of the present invention is the provision of an improved vane grid structure and method of making same.

One feature of the present invention is the provision of a vane grid structure wherein an array of inwardly directed vane grid members are bonded at their roots into respective slots in an array of axially directed slots provided in the inside wall of a grid ring.

Another feature of the present invention is the same as the preceding feature wherein the grid ring is a solid grid ring.

Another feature of the present invention is a method for manufacturing the grid of the preceding features wherein the assembled vane members are bonded at their roots with the wide sides of the vane members being bonded to the adjacent sides of the respective longitudinal slots in the inside wall of the grid ring.

Another feature of the present invention is the same as the preceding feature wherein the grid rings are slotted by stacking a plurality of such grid rings in coaxial alignment and passing a broach axially through the rings for broaching the array of longitudinal slots in the inside wall of the grid rings.

Another feature of the present invention is the same as any one or more of the preceding features wherein the grid rings are plated with a material having a melting point below the melting point of the grid ring material, and wherein the vanes are bonded to the grid ring by heating the assembled vane and grid ring structure to melt the plating, whereupon cooling a bonded joint is provided between the vanes and the walls of the slots in the grid ring.

Other features and advantages of the present invention will become apparent upon a perusal of the following specification taken in connection with the accompanying drawings wherein:

DESCRIPTION OF THE PREFERRED EMBODIMENTS

Figure 1:
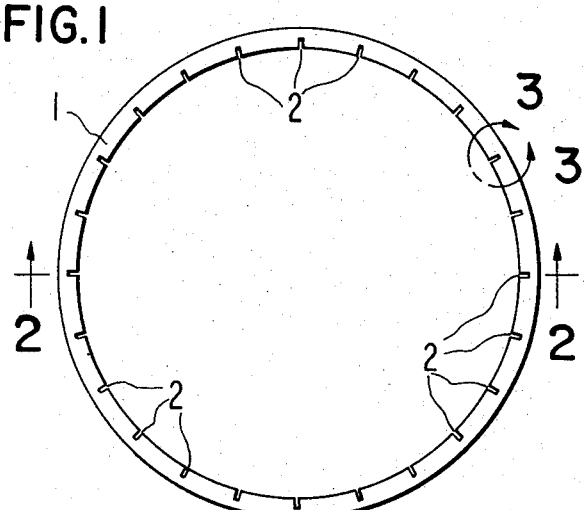
FIG. 1 is a plan view of a slotted grid ring of the present invention.
Figure 3:
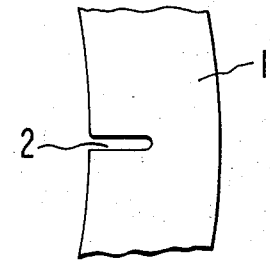
FIG. 3 is an enlarged detailed view of a portion of the structure of FIG. 1 delineated by line 3—3.
Figure 2:
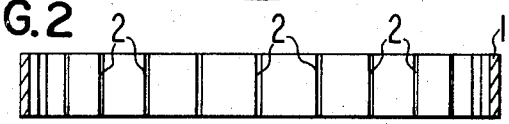
FIG. 2 is a sectional view of the structure of FIG. 1 taken along line 2—2 in the direction of the arrows.

Referring now to FIGS. 1–3, there is shown a frame or grid ring 1 of the present invention having a central passageway therethrough for the passage of charged particles. The grid ring 1 may be made of any one of a number of metals or alloys such as steel, Monel, molybdenum, copper, nickel, Kovar, etc. The grid ring 1 can have a wide range of dimensions and is conveniently formed on an automatic lathe. In a typical example, the grid ring 1 is made of steel and has an outside diameter of 0.246 inch and an inside diameter of 0.223 inch. The depth of the individual grid ring may vary over a relatively wide range and in a typical example for the aforecited dimensions is 0.030 inch.

In the method of the present invention, the grid rings 1 are formed on an automatic lathe as aforecited and then a plurality of such grid rings are stacked coaxially and a broach is passed axially through the stacked rings 1 to form an array of longitudinal peripherally spaced slots 2 in the inside wall of the stacked rings 1.

In a typical example, the slot 2, as best seen in FIG. 3, has a radial depth of 0.005 inch with a tolerance of +0.001 inch and −0.000 inch. The slot has a width, in the peripheral direction, of 0.003 inch ± 0.0005 inch.

In a typical example there are 24 slots equally spaced about the inside periphery of the grid ring 1.

In the method of the present invention, after the grid ring 1 has been slotted, in the aforedescribed manner, the grid ring 1 is plated with a material having a lower melting point than the material of the grid ring to a thickness, as of 0.0001 inch. In a typical example, the grid ring, as of steel, is plated with copper to a thickness of 0.0001 inch. The plating also extends into the slots 2.

Figure 4:
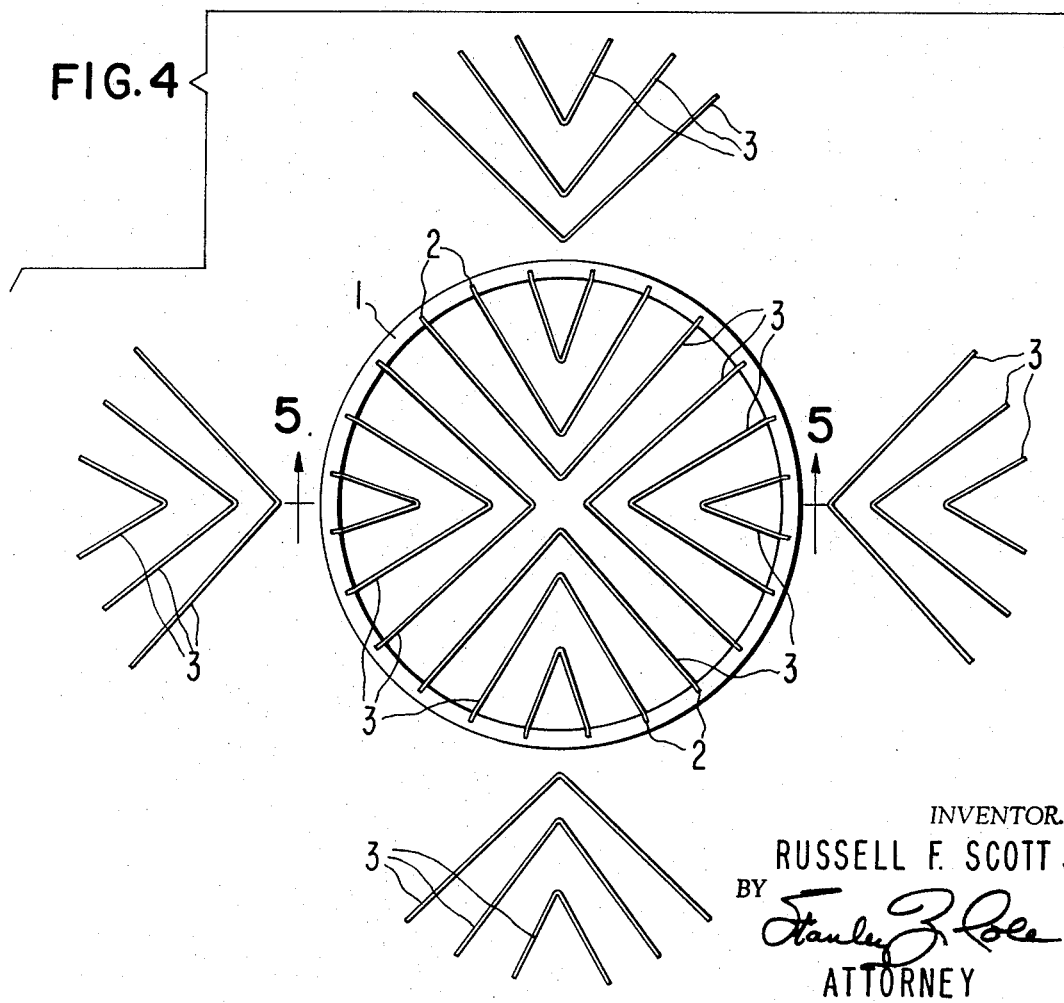
FIG. 4 is an exploded and assembled view of a vane grid structure incorporating features of the present invention.

A plurality of V-shaped metallic ribbon vane members, as of tungsten, molybdenum, nickel, or tungsten-rhenium alloy, are formed into V-shapes as shown in FIG. 4. In a typical example, there will be 12 V-shaped vanes 3 to be inserted into 24 slots 2 in the inside walls of the grid ring 1. In a typical example the V-shaped vanes 3 have a thickness of 0.001 inch and a depth of 0.020 inch.

Figure 5:
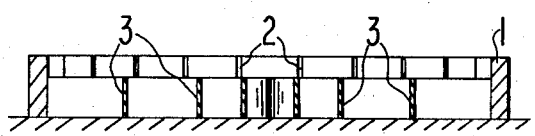
FIG. 5 is a sectional view of the structure of FIG. 4 taken along line 5—5 in the direction of the arrows.

The V-shaped vane members are assembled into the slotted grid ring 1 by inserting the ends of the vane members 3 into respective pairs of slots 2 in the slotted grid ring 1. The V-shaped vanes are assembled in a nested relation as shown in FIG. 4 with the apex portions of the vanes projecting radially inwardly of the grid ring into the passageway for charged particles. The V-shaped vanes are formed on a machine with an included angle preferably 5° to 10° greater than the included angle of the grid when assembled in the grid ring. The assembler picks up the individual V-shaped vane, compresses the vane to reduce the included angle, and inserts the ends of the vane member into the respective slots in the slotted grid ring 1. In this manner, the spring force of the vane members serves to hold the vane in the slotted grid ring. The vanes are preferably assembled with the grid ring laying upon a flat surface such that the vanes 3 may be pressed down against the surface upon which the ring 1 is resting in order to provide a flat reference plane for all of the assembled vanes as shown in FIG. 5.

After the vanes have been assembled into the plated grid ring 1, the assembly is heated in a suitable furnace to a temperature sufficient to melt the low temperature plating material, as of copper, to cause the plating material to flow into the slots around the root ends of the vanes 3, such that upon cooling, the vanes 3 are bonded at their roots to the grid ring 1 via the solidified plating material disposed between the flat sides of the grid members 3 and the corresponding longitudinally directed wide side of the slots 2 in the grid ring 1. The bonded assembly forms an integral rigid grid structure particularly useful as the interaction grids in reflex or multicavity klystron tubes of the type disclosed and claimed in U.S. Pat. No. 3,297,904 issued Jan. 10, 1967, and assigned to the same assignee as the present invention.

Although the grid ring 1 has been shown in the drawings as having a relatively small radial thickness this is not a requirement and in certain applications it is desired that the ring have a relatively wide radial thickness. In a vane grid structure as shown in FIGS. 1–3 with typical inside dimensions of 0.223 inch the outside diameter of the ring could easily be 0.348 inch, thus yielding a radial wall thickness of approximately 0.0625 inch as compared to an axial depth of 0.030 inch. In other words, the grid frame or ring 1 may be described as a centrally apertured disc.

Figure 6:
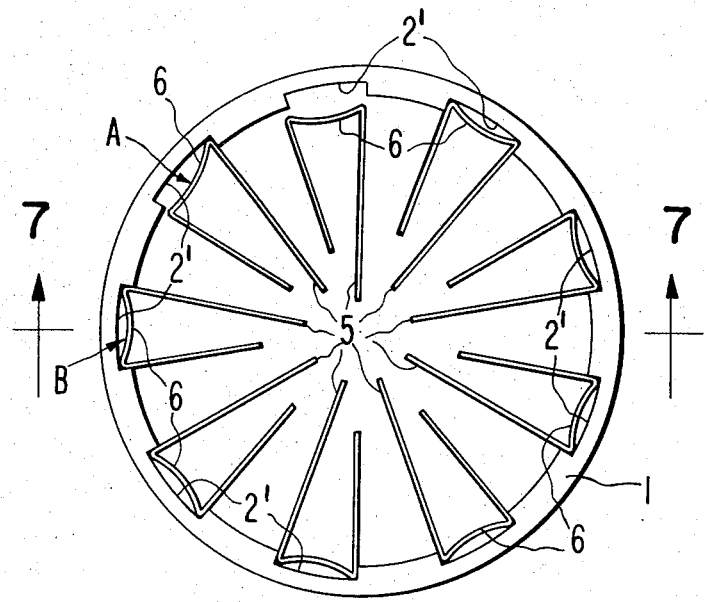
FIG. 6 is a plan view of an alternative vane grid structure incorporating features of the present invention.
Figure 7:
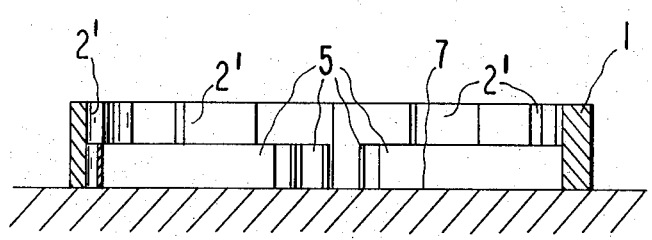
FIG. 7 is a sectional view of the structure of FIG. 6 taken along line 7—7 in the direction of the arrows.

Referring now to FIGS. 6 and 7 there is shown an alternative vane grid embodiment of the present invention. More particularly the grid ring 1, as aforedescribed with regard to the embodiment of FIGS. 1–5, has wider longitudinal slots 2' broached therein, in the same manner as aforedescribed. A plurality of inwardly directed ribbon-shaped grid vanes 5 are inserted into the slots 2'. The grid vanes 5 are of the same material and thickness as grids 3 aforedescribed except that rather than U-shaped the grids are generally pie-shaped with the wide end of the grids 5 being inserted within the slots 2'. The apex end of the pie-shaped grid is open with one side leg being shorter than the other. The wide end or root portion of each of the grids 5 is preferably concave at 6. The grids 5 are inserted into the slots 2' in the grid ring 1 by squeezing together the grid vane legs at their root ends and pushing one end of the root portion into the slot 2' as shown at (A) in FIG. 6. The other root end is then pushed into the slot 2' as shown at (B) in FIG. 6. The concave geometry of the root 6 causes the spring action of the compressed root portion of the vane grid 5 to hold the vane grid 5 in the slot 2'.

Each vane grid 5 is pushed down in the slots 2' into registration with the reference plane 7 on which the grid structure is assembled. The assembled vane grid structure is then heated to brazing temperature, as aforedescribed with regard to the structure of FIGS. 1–5, to melt the plating material and to form a brazed joint between the abutting wide side edges of the vane grids at their roots to the side walls of the slots 2' in the grid ring 1.

In a typical example, the slots 2' have a radial depth of 0.005 inch, a peripheral width of 0.032 inch and are disposed at 40° intervals about the inside circumference of the grid ring 1.

Advantages of the vane grid structure and method of making same according to the present invention, as contrasted with the prior art, are that the grid structures are more easily fabricated and are more easily fabricated to much closer tolerances. Moreover, the thickness, in the radial direction, for the grid ring can be substantially increased utilizing the structure and method of the present invention. This facilitates obtaining a grid of much greater rigidity and flatness. In addition, the tooling for manufacturing grids according to the present invention is less expensive and more easily modified to produce grids of various different sizes and dimensions. Moreover, the grid ring may be made of materials which are less ductile than those employed in the prior art grids. It has been found that the manufacturing yield utilizing the method of the present invention is greatly increased as compared with the yield utilizing the prior art method.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method for making vane grid structures the steps of, forming an array of axially directed peripherally spaced apart radial slots in the inside wall of a metallic grid ring, assembling a plurality of metallic ribbon vane members with root portions of the vane members in respective ones of said slots in the inside wall of the grid ring, the vanes being oriented with leg portions of the vane members projecting generally toward the center of the grid ring and with the wide sides of the vane members being generally parallel to the longitudinal axis of the grid ring, and bonding the wide sides of the vane members at the root portions of the assembled vane members to the sides of the respective radial slots in the grid ring, said step of assembling the vane members in the slotted grid ring includes the steps of, compressing the root end of the vane members together against the normal spring force of the vane structure, and inserting the compressed vane members into respective slots in the grid ring, and relaxing the compressive force first exerted on the vane members to allow the vane members to press against the longitudinal side walls of the slots in the grid structure due to their own spring force for retaining the vane members in the slots in which they were assembled.

2. The method of claim 1 wherein the step of forming the array of slots in the grid ring comprises the step of stacking and holding a plurality of said grid rings in coaxial alignment, and passing a broach axially through the central passageway in the stack of grid rings to form the array of longitudinal peripherally spaced slots in the inside wall of the grid rings.

3. The method of claim 1 including the step of, plating the slotted grid ring with a metallic plating material having a melting temperature below the melting temperature of the grid ring, and wherein the step of bonding the vane members to the grid ring includes the step of heating the assembled vane and grid ring to a temperature to cause the plating material to melt and form a bond, upon cooling, between the vane and slotted grid ring members.

* * * * *